Dec. 12, 1939.     E. H. FORS     2,182,892
SEAL
Filed Dec. 31, 1937
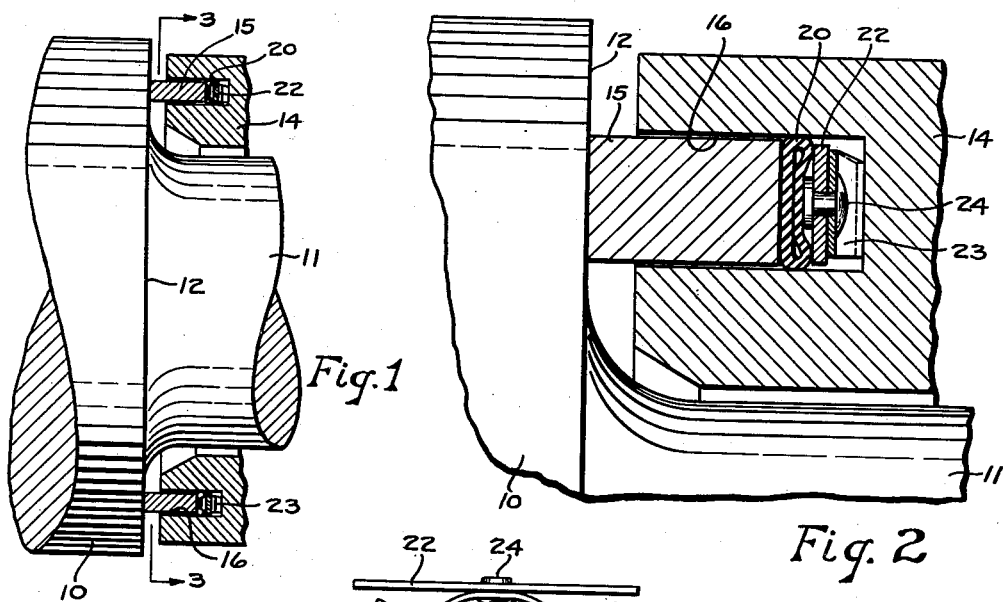
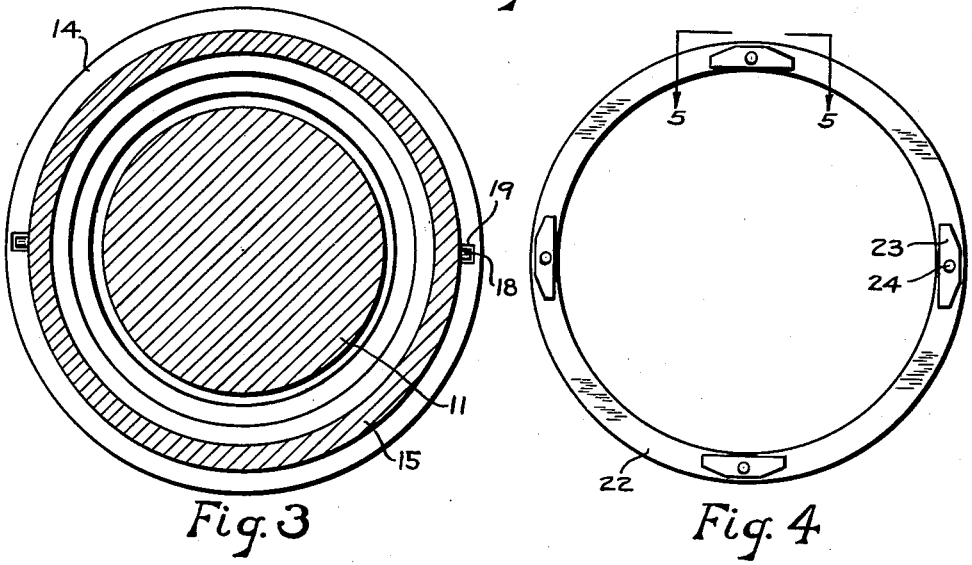
INVENTOR
ERIC H. FORS
BY Albert G. Blodgett
ATTORNEY Patented Dec. 12, 1939

2,182,892

UNITED STATES PATENT OFFICE 2,182,892

SEAL

Eric Harry Fors, St. Albans, England, assignor to Morgan Construction Company, Worcester, Mass., a corporation of Massachusetts Application December 31, 1937, Serial No. 182,847

1 Claim. (Cl. 286—7)

This invention relates to seals, and more particularly to the construction and arrangement of seals for excluding foreign matter, such as water and scale, from the roll neck bearings in a rolling mill.

In the rolling of hot metal bars, strips, sheets, etc., it is customary to apply large quantities of water to the rolls, and such of the scale which is produced by oxidation of the stock is carried away by the water. If this water and scale reaches the roll neck bearings or mingles with the bearing lubricant, serious damage may result. This problem has been recognized and it has been proposed to form the bearing casing with an annular groove and to mount a seal ring in this groove, with springs behind the ring arranged to force the ring axially into contact with the end of the roll barrel. In order that the rings may be interchangeable and to avoid binding and allow for differences in expansion with temperature changes, it is necessary to provide appreciable clearances between the ring and the sides of the groove. These clearances afford leakage paths for the water and scale, and thus prevent the seal from operating efficiently.

It is accordingly one object of the invention to provide a comparatively simple and inexpensive seal which will be highly efficient in excluding foreign matter from a bearing or other device.

It is a further object of the invention to provide an efficient seal which can be made interchangeable with other similar seals without requiring extreme accuracy in its manufacture.

It is a further object of the invention to provide an efficient seal which will be very compact and which is particularly suitable for installation in the restricted space available between a roll neck bearing and the end of the roll barrel.

With these and other objects in view, as will be apparent to those skilled in the art, the invention resides in the combination of parts set forth in the specification and covered by the claim appended hereto.

In accordance with my invention in its preferred form I provide a seal ring which is mounted on a supporting structure, such as the casing of a roll neck bearing, the ring being urged axially by springs or other resilient means into contact with a shoulder on the roll. The casing is preferably formed with an annular groove to receive the ring. Between the ring and the springs there is provided packing material which is forced laterally, by the pressure of the springs, against the sides of the groove. In the preferred construction the packing is formed from a tube of flexible material, such as rubber, and the springs are of the leaf type and secured to a comparatively rigid ring which engages the rubber packing.

Referring to the drawing illustrating one embodiment of the invention and in which like reference numerals indicate like parts, Fig. 1 is a view showing the invention applied to a horizontal roll, certain parts being shown in longitudinal section;

Fig. 2 is a fragmentary view of a portion of Fig. 1, on a greatly enlarged scale;

Fig. 3 is a section on the line 3—3 of Fig. 1;

Fig. 4 is an axial elevation of a pressure ring and the springs associated therewith; and Fig. 5 is a view taken on the line 5—5 of Fig. 4.

The embodiment illustrated comprises a horizontal roll 10 having a roll neck 11 and a shoulder 12 on the end of the roll barrel. The roll neck 11 is rotatably supported in a bearing having a casing 14 of which only a portion is shown. The roll neck bearing is preferably of the oil film type disclosed in the United States patent to Dahlstrom No. 2,018,055.

In the process of rolling hot metal, large quantities of water are applied to the roll 10, and it is important to exclude this water and any scale carried thereby from the roll neck bearings. For this purpose a seal ring 15 is supported by the bearing casing 14 in surrounding relation to the roll neck 11 and in contact with the shoulder 12 on the roll. The ring 15 is mounted within an annular groove 16 formed in the end of the casing 14 adjacent the shoulder 12. As shown in Fig. 2, ample radial clearance is provided between the ring and the inner and outer walls of the groove, so that the ring will be free to expand and contract with temperature changes without binding. In order to prevent the ring from turning with the roll, pins 18 (Fig. 3) may extend radially outward from the ring into slots 19 in the outer wall of the groove 16.

It is important to prevent leakage through the above described radial clearance spaces, and for this purpose there is provided a packing ring 20 of a suitable flexible material located behind the seal ring 15. This ring 20 is preferably formed of a single piece of rubber tubing having an outside diameter substantially less than the width of the groove 16, cut to the proper length and bent into a circle, with the abutting ends located at the bottom of the ring. Behind the rubber tubing 20 there is provided resilient means for forcing the tubing against the seal ring 15 and against the sides of the groove 16. The preferred construction comprises a comparatively rigid ring 22 which is pressed axially against the tubing 20 by means of a series of circumferentially spaced leaf springs 23. These springs engage the bottom of the groove 16, and in order to hold them in proper position they are fastened to the ring 22 by means of rivets 24. By using several of the springs 23, the load on the ring 22 is distributed, and it is possible to make this ring comparatively thin in the axial direction.

It will now be apparent that when the various parts are assembled the springs 23 will force the ring 22 axially against the rubber tubing 20, which in turn will force the seal ring 15 axially against the shoulder 12 on the rotating roll 10. The axial pressure of the ring 22 against the tubing 20 will flatten the tubing, as shown particularly in Fig. 2, spreading it laterally against the inner and outer sides of the groove 16. This will prevent any leakage of water behind the seal ring 15, despite the ample radial clearance. The entire construction is very compact and well adapted for use with roll neck bearings. Since none of the parts require great accuracy in manufacture, they can be made interchangeable at a comparatively low cost.

Having thus described my invention, what I claim as new and desire to secure by Letters Patent is:

A seal comprising two relatively rotating parts one of which provides a shoulder and the other of which provides a supporting structure having an annular groove therein adjacent the shoulder, a seal ring mounted in the groove and slidable axially into contact with the shoulder, a packing ring formed of rubber tubing located in the groove behind the seal ring, the tubing having, when in an unstressed condition, an outside diameter substantially less than the width of the groove, and resilient means located in the groove behind the packing ring and arranged to apply sufficient pressure thereto in the axial direction to force the seal ring against the shoulder and to spread the tubing radially against the sides of the groove, thereby preventing leakage between the seal ring and the supporting structure.

ERIC HARRY FORS.